Feb. 26, 1957 H. W. DERRICK, JR 2,782,927
VIBRATING SCREEN
Filed Feb. 17, 1955 2 Sheets-Sheet 1
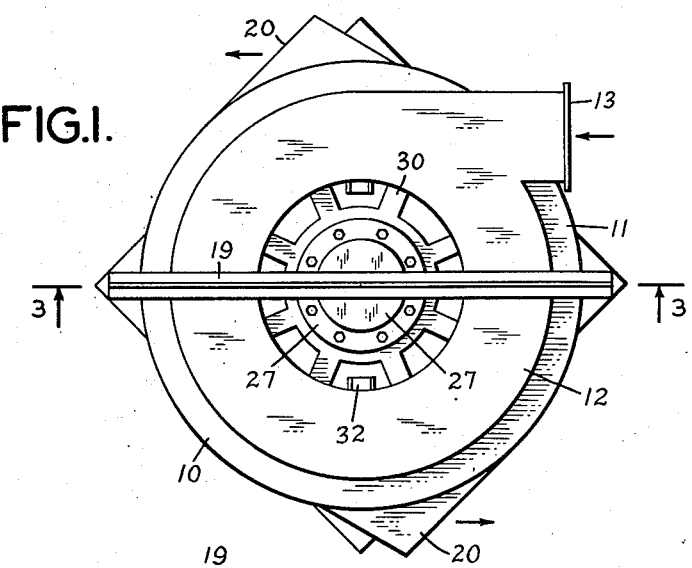
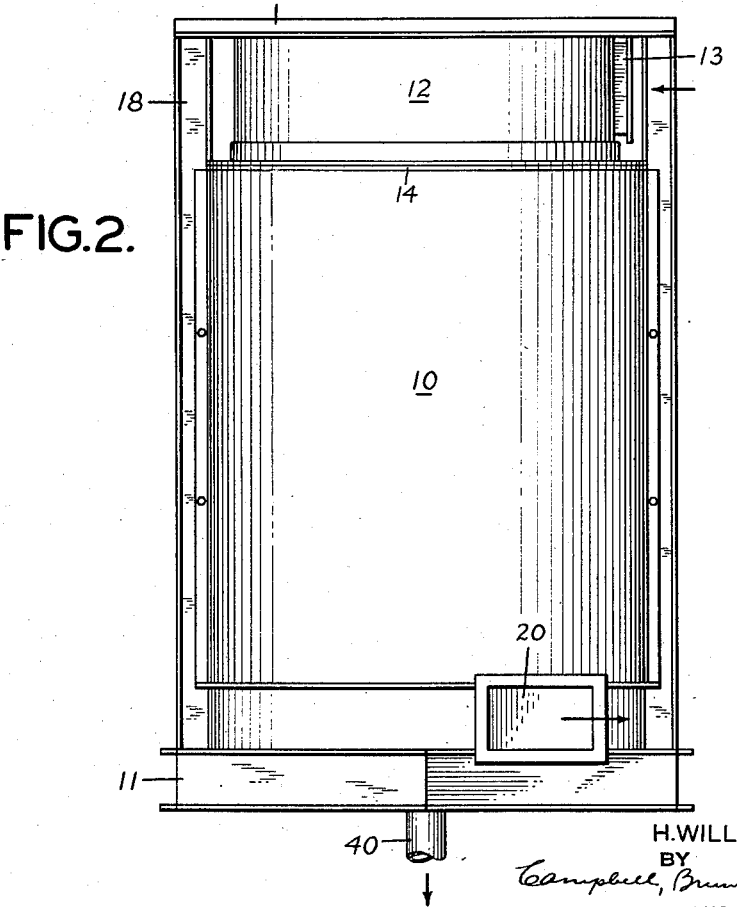
INVENTOR
H. WILLIAM DERRICK, JR.
BY
HIS ATTORNEYS

United States Patent Office 2,782,927
Patented Feb. 26, 1957

2,782,927

VIBRATING SCREEN

Herbert William Derrick, Jr., Buffalo, N. Y.

Application February 17, 1955, Serial No. 488,846

5 Claims. (Cl. 209—250)

This invention relates to vibrating screening devices, and, more particularly, to a device of this general organization wherein the material to be screened is introduced in a moving fluid stream into a housing containing a vibrating screen and a whirling motion is imparted to the fluid stream producing a centrifugal force which urges the material into contact with the vibrating screen as it travels through the housing, the material passing through the screen and the oversize material being ultimately discharged from the housing via separate outlets.

The screening unit of the present invention includes a housing stably supported upon a base and a vibrating screen supported within the housing on cushioning mounts so that the vibrations will not be transmitted to the housing. The material to be screened is introduced in a moving fluid stream into a circular channel at one end of the housing, and this circular channel imparts a whirling motion to the fluid stream and the material to be screened carried thereby as it moves through the housing toward discharge outlets at the other end of the housing. The centrifugal force produced by this whirling motion moves or impels the material to be screened into contact with the screen as it passes through the housing, and the finer particles are forced through the screen and are ultimately discharged via an outlet at the opposite end of the housing, permitting the finer particles to be collected. The oversize material, unable to pass through the screen, will be discharged through a separate outlet in the housing and may, therefore, be separately collected.

The effect of the vibrating screen and the whirling motion of the material as it moves relative to the vibrating screen combine to greatly improve the screening efficiency. A possible explanation of the effect of the vibrating screen is that the moving fluid stream passing through the screen encounters a pumping or pulsating action which not only helps to move the finer particles of the material through the screen, but is helpful in moving the oversized material toward its discharge outlet. The centrifugal force, will, of course, prevent material from becoming wedged in the screen.

The vibrating screening device of the present invention is capable of a wide variety of applications, among them being the screening of grain, flour, talc, crop dusting powders, plastics, wood flour, fillers, fine chemical powders, gypsum, cement, soap dust products, and many other applications wherein the material to be screened can be conveyed in a fluid stream. The present invention makes possible the handling of great quantities of material at high speed and in a continuous flow, as distinguished from conventional screening devices which can only handle one load at a time and wherein size of the load is limited because the degree of amplitude of vibration of the screening unit is proportional to the weight of the vibrated load. The screening unit of the present invention on the other hand is not limited by these various factors and in addition, it is capable of operating in a fairly high capacity because of the increased efficiency, the decrease of power consumption, and the advantage of a greatly increased screening area over that which can be practically employed in conventional screening devices.

These and other features of the present invention will be apparent by reference to the detailed description of the invention which follows and to the accompanying drawings in which:

Figure 1 is a plan view of a screening unit embodying the present invention;

Figure 2 is an elevation view of the unit;

Figure 4:
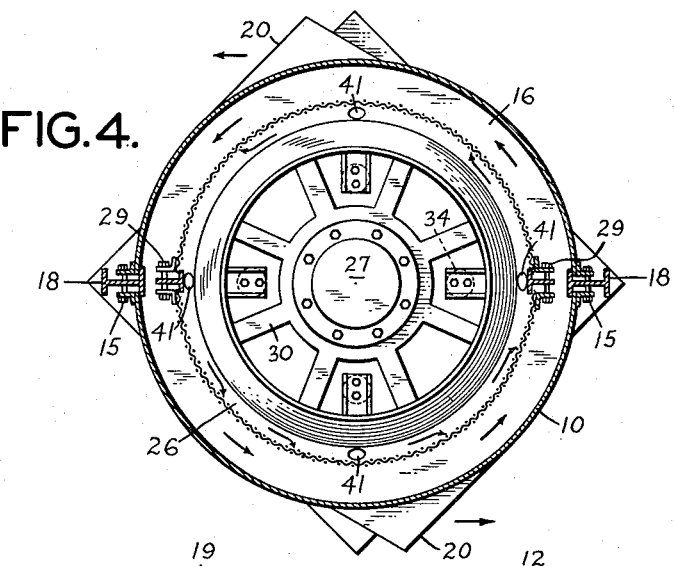
Figure 4 is a cross-section view taken on the line 4—4 of Figure 3, looking in the direction of the arrows.

Referring to the drawings, the apparatus of the present invention is enclosed within a cylindrical shell or housing 10 which is supported on a base 11. A circular duct or channel 12 having an inlet opening 13 leading tangentially into the duct is disposed above the housing 10, and the duct 12 is bottomless so that the duct communicates with the interior of the housing. A circular gasket 14 (see Figure 3) forms a seal between the outer wall 12a of the duct and the top of the housing 10.

The lower end of the housing communicates with a circular duct or channel 16 of U-shaped cross-section which is disposed between the base 11 and the lower end of the housing, and the upper edge of the outer wall 16b of the channel 16 and the lower edge of the housing 10 are maintained in sealed relationship by a gasket 17. As shown in Figures 1 and 4, discharge openings 20 are formed in the outer wall 16b to discharge the material tangentially from the circular duct.

The housing 10 is formed by two semi-cylindrical shells connected in sealed abutting relationship by any suitable means, such as by the threaded bolts or rivets 15 joining radial flanges of the shells. For added support, the shells are connected to upright structural members 18 at each of the joints. The upright members 18 are anchored at their lower ends to the base 11, and a crossbeam 19 connects the upper ends of the upright members 18.

A hollow truncated conical wall 23 is mounted within the housing 10, and the wall 23 supports and is surrounded by a cylindrical screen 24. The screen 24, like the housing 10, is made of two semi-cylindrical halves which are held together in abutting fashion by bolts or rivets 29. For screening particularly fine particles, a cloth may be employed bonded to a perforated plate which has been rolled to the proper shape. A reactivating cement may be used to bond the cloth to the plate, and a new cloth may be substituted on the same plate by removing the cement with a volatile solvent.

Figure 3:
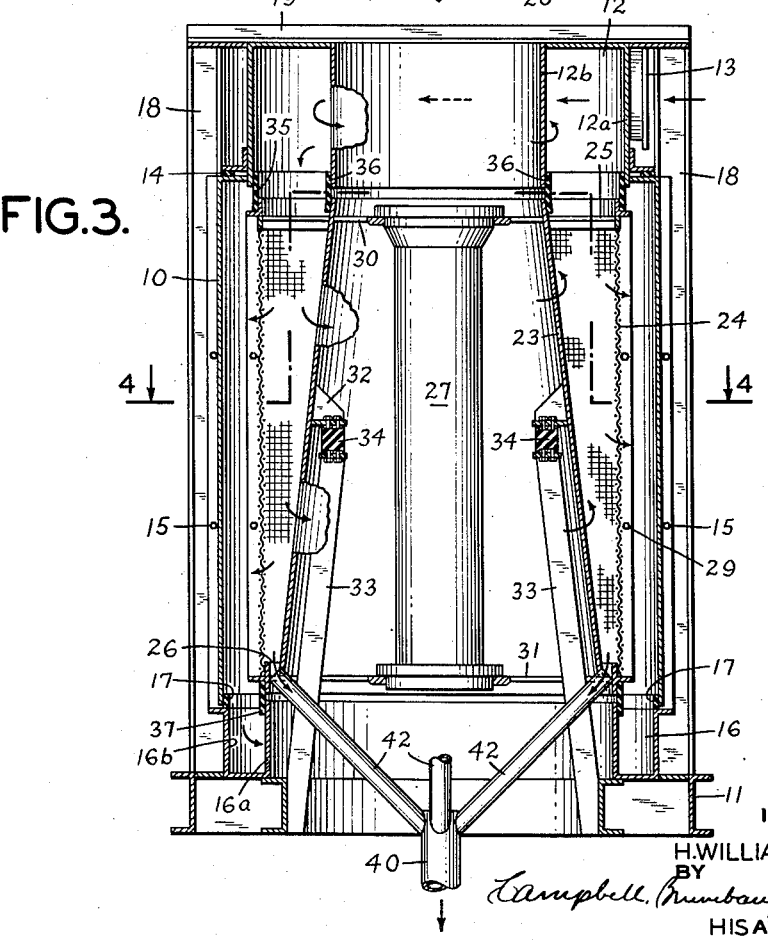
Figure 3 is a vertical cross-section view taken on the line 3—3 of Figure 1, looking in the direction of the arrows.

The upper ends of the screen and the conical wall are spaced further apart and are connected by radial ribs 25 (see Figure 3). The wall 23 tapers outwardly toward the lower end, and the lower end of the wall 23 and the screen 24 are connected by an annular ring 26 which serves as an end closure or floor for the space between the outer surface of the conical wall and the screen.

A vibrator 27, preferably of the type disclosed in copending application Serial No. 344,734, filed March 26, 1953, is accommodated within the hollow conical wall 23. The vibrator 27 is connected to the conical wall 23 at its upper and lower ends by web-like discs 30, 31 respectively, and the vibrator oscillates at right angles to its axis so that the vibrations are imparted to the screen 24 and the conical wall 23.

The vibrating unit, which includes the screen 24, the conical wall 23 and the vibrator 27, is supported in floating fashion so that it is free to oscillate independently of the housing. The floating supporting means includes the brackets 32 carried by the inner surface of the conical wall, the upstanding legs 33, and the rubber cushions separating the brackets 32 and the legs 33.

The material to be screened is introduced in a moving air stream through the inlet opening 13, and the circular duct 12 imparts a whirling, helical motion to the air stream as it carries the material into the space formed by the outer surface of the wall 23 and the inner periphery of the screen 24. To facilitate the passage of the material from the duct 12 to the space between the wall 23 and the screen, the diameters of the screen 24 and the outer wall 12a of the duct are substantially equal, and the diameters of the upper end of the wall 23 and the inner wall 12b of the duct are substantially equal. Moreover, in order to insure a sealed passage from the duct 12 to the space inside the screen 24, the upper rim of the screen and the wall 12a are connected by a flexible seal 35 and the upper end of the wall 23 and the wall 12b are connected by a flexible seal 36. A flexible seal 37 also connects the lower rim of the screen 24 and the inner wall 16a of the duct 16. The flexible seals 35, 36 and 37 permit the vibration of the vibrator, the screen and the conical wall independently of the stationary structure of the apparatus.

The space within the housing 10, but outside the screen, communicates at its lower end with the circular duct 16 to permit the discharge of the air stream and the fine material which passes through the screen via the discharge openings 20. The space between the screen 24 and the outer surface of the conical wall 23 communicates at its lower end with a vertically disposed discharge conduit 40 through a plurality of apertures 41 in the floor or base 26 and the downwardly inclined feeder conduits 42 which connect the apertures 41 with the main conduit 40. The outward taper of the base of the conical wall 23 serves to guide the oversize material which does not pass through the screen 24 toward the apertures 41. If desired, the apertures 41 may be provided with scoops to facilitate the flow of the oversize material into the conduits 42, and the floor or base 26 may be sloped toward the apertures 41.

In operation the material to be screened is admitted through the inlet opening 13 in a rapidly moving air stream produced by a blower (not shown), and a whirling motion is imparted to the material by the circular duct 12 at the upper end of the housing 10. The rapidly moving air stream, therefore, moves through the housing 10 at great speed and the centrifugal force of the whirling motion is such that much of the air passes through the screen and continues, still in a whirling motion, to the duct 16 and the discharge openings 20. Consequently, the material to be screened which is carried by the moving air stream is impelled toward the screen. The finer particles, of course, pass through the screen and are carried along by the whirling air stream, ultimately being discharged through the outlets 20 of the circular discharge duct 16. The fine dust laden air will, after discharge, be separated from the air stream and collected.

The heavier, coarser material continues to be whirled in a helical path and ultimately is discharged through the discharge apertures 41 at the lower end of the housing, passing through the feeder conduits 42 to the main discharge conduit 40. Because of the wider diameter of the lower end of the conical wall 23, the horizontal cross-sectional area of the space between the wall 23 and the screen becomes more restricted near the bottom thereby insuring that the material will be maintained in close contact with the screen so that the finer particles will have ample opportunity to pass through the screen. As mentioned above, the tapering wall 23 also serves to guide the falling particles toward the discharge apertures 41 at the lower end of the housing.

The invention has been shown in preferred form and by way of example only, and obviously many modifications and variations may be made therein, without departing from the spirit of the invention. It is understood however, that the invention is not to be limited to any specified form of embodiment except insofar as such limitations are set forth in the claims.

I claim:

1. A vibrating screen device comprising a housing, a screen of circular cross-section accommodated within the housing, annular means connecting said screen to the housing, an inlet opening in the housing for admitting a moving fluid stream carrying the material to be screened, means for guiding the fluid stream to impart a whirling motion thereto, said whirling motion impelling the material to be screened into contact iwth the screen, means for vibrating the screen, separate discharge openings in the housing for the material which passes through the screen and the oversize material, and annular seals intermediate the screen and the annular means connecting the screen to the housing to cushion the screen so that it will be vibrated independently of the housing and to prevent the escape of the material between the screen and the annular means connected to the housing.

2. A vibrating screen device comprising a housing, a cylindrical screen disposed longitudinally within said housing, annular means at each end of the cylindrical screen for connecting the screen to the housing, annular cushioning seals intermediate the screen and the annular means at each end of the screen to permit the screen to be vibrated independently of the housing and to prevent the escape of the material to be screened therebetween, an inlet opening at one end of said housing for admitting a moving stream of the material to be screened into the housing, means for guiding said moving stream to impart a whirling motion thereto and for introducing the material to be screened within the screen, the centrifugal effect of the whirling motion carrying the material into contact with the screen to permit the finer particles to pass through the screen, a discharge opening at the other end of the housing for discharging the finer particles which pass through the screen, a discharge opening for the oversized material which does not pass through the screen, a vibrator, means connecting the vibrator and the screen, and cushioning means for supporting the vibrator and the screen for vibration independent of the housing.

3. A vibrating screening device as set forth in claim 2 including a conical wall disposed longitudinally and coaxially within the cylindrical screen and tapering outwardly toward the discharge end of the housing, means connecting the conical wall and the vibrator, and cushioning means connecting the conical wall and the housing.

4. A vibrating screen device comprising a housing, a cylindrical screen disposed longitudinally within said housing, a hollow truncated conical structure disposed substantially coaxially within the screen and connected with the screen, an inlet opening at one end of the housing for admitting a moving stream of the material to be screened into the housing, a circular duct communicating with the inlet opening to give a whirling motion to the moving stream, said circular duct, in turn, communicating with the space between the exterior surface of the hollow conical structure and the inner surface of the screen, the centrifugal effect of the whirling motion impelling the material into contact with the screen to permit the finer particles to pass through the screen, a discharge opening for the finer particles which pass through the screen, a discharge opening for the oversize material which does not pass through the screen, means for vibrating the screen to improve the efficiency of the screening effect, upstanding legs mounted at their lower ends to a stationary base and extending within said hollow conical structure, and cushioning means connecting the legs to the conical structure, whereby the conical structure, the screen and the means for vibrating the screen are supported for vibration independently of the housing.

5. A vibrating screen device according to claim 4 including flexible seals to connect the circular duct with the space formed between the exterior surface of the hollow conical structure and the inner surface of the screen, said flexible seals permitting the vibration of the screen and conical structure independently of the housing.

References Cited in the file of this patent

UNITED STATES PATENTS

| | | |
|---|---|---|
| 2,219,453 | Mosley | Oct. 29, 1940 |
| 2,459,660 | Lange | Jan. 18, 1949 |

FOREIGN PATENTS

| | | |
|---|---|---|
| 22,051 | Finland | Oct. 24, 1947 |